HORST SIMON
INVENTOR.

United States Patent Office 3,353,766
Patented Nov. 21, 1967

3,353,766
MEANS FOR RETAINING A FILM TO A CAMERA TAKE-UP SPOOL
Horst Simon, Fellbach, near Stuttgart, Germany, assignor to Eastman Kodak Company, Rochester, N.Y., a corporation of New Jersey
Filed May 4, 1966, Ser. No. 547,520
Claims priority, application Germany,
May 6, 1965, K 56,025
9 Claims. (Cl. 242—74.2)

ABSTRACT OF THE DISCLOSURE

The application discloses a film retaining means operatively associated with a take-up spool for engaging and retaining the end of a film within the spool. Means are provided for rendering the film-retaining means effective to engage and retain a film in response to actuation of the film-feed mechanism. Means are further provided for rendering the film feeding means ineffective to retain the film in response to actuation of a rewind mechanism. Reference is made to the claims for a legal definition of the invention.

---

This invention relates to a photographic or cinematographic camera and more specifically to a means for retaining or securing the film to the take-up spool of such a camera.

Devices for securing film to a take-up spool have been used in the prior art. In some cameras, the leading end of the film is inserted into a narrow slot in the take-up spool, which may be provided with rigid or resilient teeth, and secured by one or more turns of the film. In other cameras, clamping means are associated with the film spool and designed to respond to tension for securing the film. With respect to both designs, it is difficult to insert the leading end of the film into the relatively narrow slot provided.

The devices for automatically fastening the leading end of the film in connection with threading devices in cinematographic cameras require a considerable technical effort, particularly if the leading end of the film is secured to the take-up spool by a clamping means.

It is a principal object of the present invention to provide a simple means for inserting and retaining the leading end of a film to a take-up spool which is not subject to the aforementioned disadvantages.

Another object of the invention is to provide a film-retaining device on a take-up spool which is operatively associated with the film-feed and rewind mechanisms to be operated in response to actuation of said mechanisms.

In a preferred embodiment of the invention, a film-retaining means is operatively associated with a take-up spool for engaging and retaining the end of a film within the same. Means are provided for rendering the film-retaining means effective to engage and retain a film in response to actuation of the film-feed mechanism and means are provided for rendering the film-retaining means ineffective to retain the film in response to actuation of the rewind mechanism. The structure of the retaining means is such that the end of a film may be inserted with minimum effort.

Figure 1:
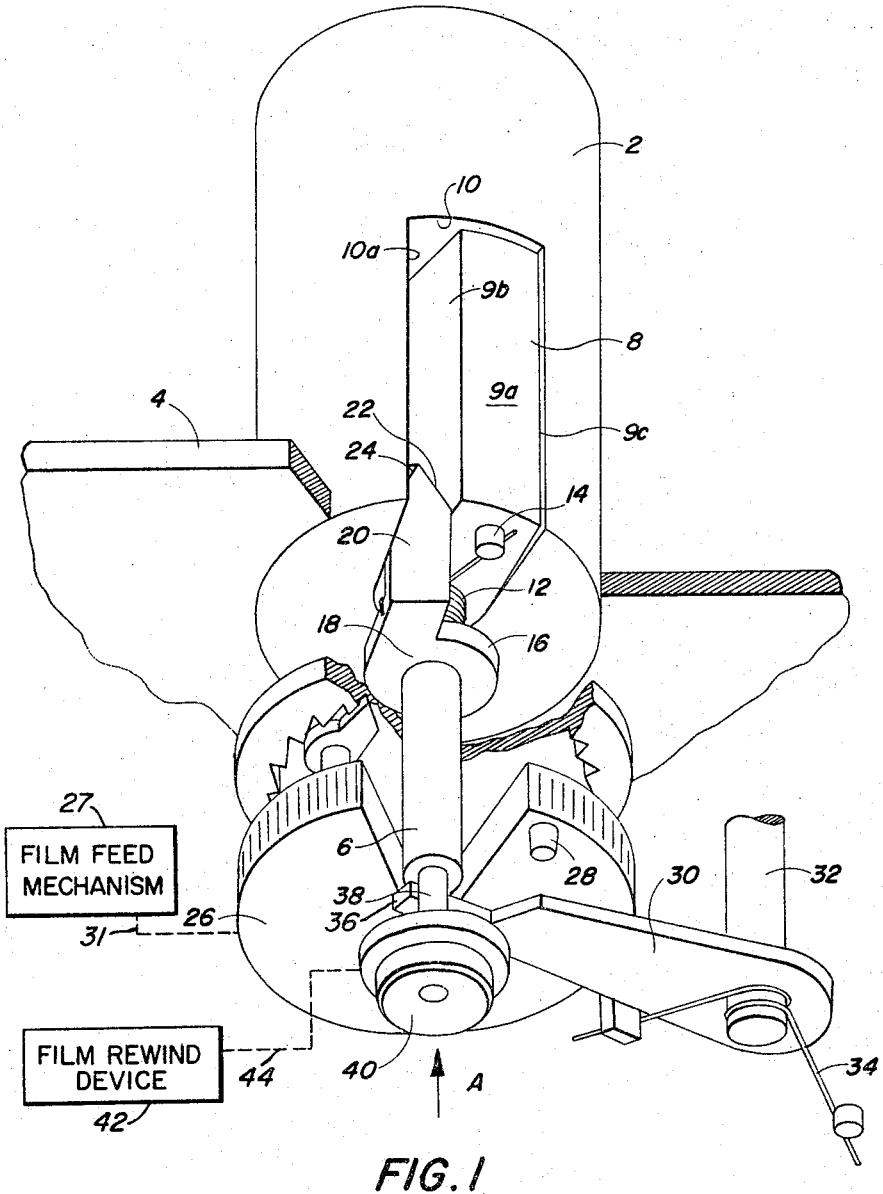
Figure 2:
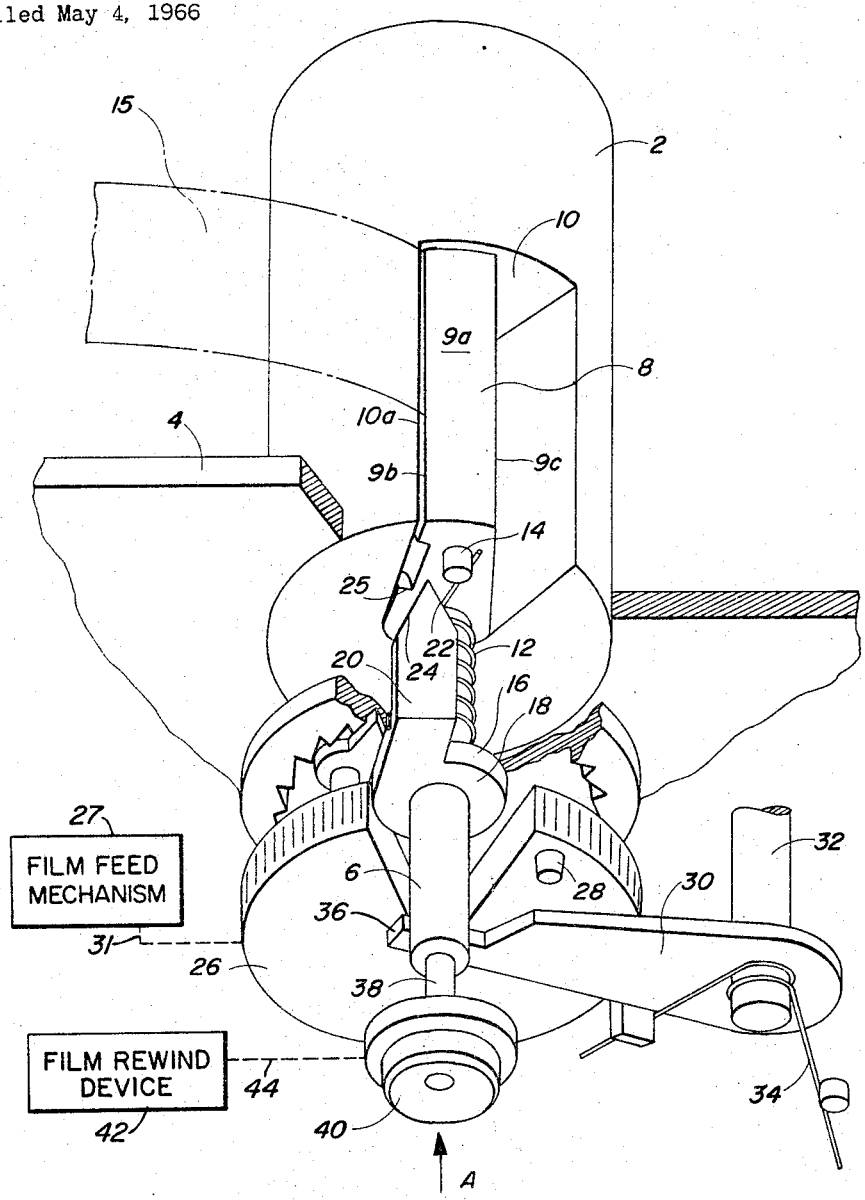

Other objects and advantages will become apparent from the following description taken in connection with the accompanying drawings wherein:

FIGURE 1 is a perspective view of a take-up spool and a portion of a camera incorporating a film-retaining means in accordance with the invention; and FIGURE 2 is a view similar to FIGURE 1 illustrating different positions of some of the parts depicted in FIGURE 1.

Referring to FIGURE 1 of the drawings, there is shown a hollow take-up spool 2 of generally cylindrical configuration which is rotatably mounted on a camera housing 4 (only partly shown) and is adapted to be rotated by a driving mechanism (not shown) operatively associated with gear or wheel 26. A clamping means comprising a jaw member 8 is physically positioned in the take-up spool 2 and is pivotally mounted on the elongated shaft 6 for movement between operative and inoperative clamping positions relative to the spool 2. More specifically, the jaw member 8 defines a curved front surface 9a and side surfaces 9b and 9c, and is received in an elongated slotted opening 10 in the side and bottom walls of the spool 2 with considerable clearance as shown in FIGURE 1. The jaw member 8 is movable within the confines of the slotted opening 10, and in FIGURE 1 is depicted in its most clockwise, or inoperative position in which it is ineffective to retain the film. With the parts in the positions shown in FIGURE 1, a film end 15 may be inserted in the clearance between the surface 9b of the jaw member 8 and the edge 10a of slotted opening 10, whereupon counterclockwise rotation of the jaw member 8 to the position shown in FIGURE 2 will clamp the film end as shown in FIGURE 2 between the edge 10a of the slotted opening and the surface 9b of jaw member 8.

A biasing means comprising a coil spring 12 encircles the shaft 6 as shown in FIGURE 1, and has one end engaging a pin 14 extending from the lower end of jaw member 8, the other end of the spring 12 being retained as will later be described. The biasing means comprising spring 12 is effective to bias the jaw member 8 in a counterclockwise direction and thus to its closed or operative position depicted in FIGURE 2.

If desired, the surface 9b of the jaw member 8 and/or the edge 10a of opening 10 may be provided with a friction-increasing coating, e.g. rubber, plastic or the like to augment the clamping effectiveness of the surfaces. In addition, or alternatively, these surfaces can be provided with spikes, hooks, etc. for increasing the effectiveness of the clamping means.

A slide actuating member 16 is rigidly connected to the shaft 6 below the spring 12 and comprises a flange 18 against which one end of the spring 12 abuts and an upstanding arm 20 extending upwardly into opening 10. The upper end of the arm 20 is tapered and wedge-shaped as shown to define wedge surfaces 22 and 24. The lower end of the coil spring 12 is bent over the edge of slide member 16 to engage slide member 16. The spring 12 in addition to biasing the jaw member 8 also provides a biasing means for biasing the assembly of shaft 6 and member 16 to the lowermost position thereof depicted in FIGURE 2.

The slide actuating member 16 is effective to position the jaw member 8 between its closed and open positions or thus its operative and inoperative positions in response to axial displacement of the shaft 6. In the position shown in FIGURE 1, the shaft 6 is in its uppermost position and the wedge-shaped upper portion of actuating member 16 is positioned between the surface 9b of the jaw member 8 and the edge 10a of slotted opening 10 as shown to establish the open or inoperative portion of the jaw member 8. In the lowermost position of shaft 6 (FIGURE 2) the upper wedge-shaped portion of the arm 20 is retracted from the slotted opening 10, permitting the jaw member 8 to assume its closed or operative position.

From the position shown in FIGURE 2, upward axial movement of the shaft 6 will cause the wedge-like surface to engage and displace the jaw member 8 with a wedging action. To facilitate inserting of the wedge-shaped end portion 20 between the jaw member 8 and the edge of slotted opening 10, the lower portion of surface 9b of jaw member 8 is recessed at 25 as shown in FIGURE 2.

Mounted on the lower portion of shaft 6 is an operating member comprising circular wheel 26 which is operatively connected to a film-feed mechanism 27 as functionally indicated by the dashed line 31 which in turn may be coupled to the shutter cocking mechanism (not shown). An abutment or pin 28 is fixed to the lower surface of wheel 26 for engagement with detent means comprising a lever 30 pivotally mounted on a shaft 32 as shown. A biasing means comprising a spring 34 encircling shaft 32 and having the ends thereof engaging suitable abutments as shown in FIGURE 1, biases the lever 30 in a clockwise direction as viewed in FIGURE 1, whereby an end portion 36 of the lever 30 engages a recessed portion 38 of the shaft 6 in the position shown in FIGURE 1 to prevent axial displacement of the shaft 6.

To complete the assembly, an operating member comprising a button 40 is fixed to the lower end of shaft 6 to provide for axial displacement thereof. The button, when depressed in the direction of arrow A, serves to effect positioning of the shaft 6. The button 40 or shaft 6 may be suitably arranged as functionally indicated in the drawings to engage or operate a film rewinding device 42 which may take various forms well known to those skilled in the art. By way of example, the button 40 may be arranged to operate the rewind device 42 through a suitable linkage functionally indicated by the dashed line 44.

Considering now the operation of the mechanism, FIGURE 1 of the drawings illustrates the positions of the parts prior to insertion of a film. With the parts in the positions shown in FIGURE 1, the leading end 15 of a film is loosely inserted into the space between the surface 9b of the jaw member 8 and the edge 10a of the slotted opening 10. During actuation of the film-feed mechanism, wheel 26 is turned in a clockwise direction causing pin 28 to engage lever 30 and position it in a counterclockwise direction relative to shaft 32 against the bias of spring 34. As a result, portion 36 of lever 30 will move out of the recessed portion 38 to release slide member 16 and shaft 6 for axial displacement as a unit downward away from spool 2. The resulting movement of slide member 16 withdraws the wedge-shaped upper portion of arm 20 from the space between surface 9b of jaw member 8 and the edge 10a of slotted opening 10. As a result, jaw member 8 will be displaced counterclockwise on shaft 6 under the bias of spring 12 to clamp the leading end 15 of the film between the surface 9b of the jaw member 8 and the edge 10a of the slotted opening 10. When so clamped, the film end is rigidly secured to the spool 2 and may be wound thereon either step by or step or continuously.

FIGURE 2 of the drawings illustrates the final position of the parts after the operation described above. For engaging the rewinding device 42 and releasing the leading end 15 of the film, the button 40 may be depressed in the direction of arrow A against the bias of spring 12 to displace the shaft 6 and slide member 16 upward to cause the wedge-like surfaces 22 and 24 to engage the edge 10a of the slotted opening 10 and the surface 9b of the jaw member 8 to force the jaw member 8 in a clockwise direction to the position shown in FIGURE 1. When the shaft 6 and slide member 16 are displaced upwardly to the position shown in FIGURE 1, the portion 36 of lever 30 will engage the recessed portion 38 of shaft 6 to retain the shaft 6, slide member 16 and jaw member 8 in the position shown in FIGURE 1. On completion of the subsequent rewinding process, the position of the individual parts remain as shown in FIGURE 1 until the film-feed mechanism is again actuated.

While the invention has been described in detail with reference to a preferred embodiment thereof, it will be obvious that variations and modifications can be effected without departing from the spirit and scope of the invention as described above and as defined in the appended claims.

It is claimed and desired to secure by Letters Patent of the United States:

1. In a photographic or cinematographic camera having a film-feed mechanism for advancing film and a rewind mechanism for rewinding film, the combination comprising: a take-up spool having an elongated slotted opening, said take-up spool being adapted to have film wound thereon during operation of the film-feed mechanism and unwound therefrom during operation of the rewind mechanism; film-clamping means operatively associated with said slotted opening for engaging and retaining the end of a film within said slotted opening; an actuating member operatively associated with said film-clamping means having a first position in which said film-clamping means is ineffective to engage and retain the film and a second position wherein said film clamping means is effective to engage and retain the film; means for positioning said actuating member from said first to said second positions in response to actuation of the film-feed mechanism; and means for positioning said actuating member from said second to said first position and for rendering the rewind mechanism operative to rewind film.

2. In a photographic or cinematographic camera having a film-feed mechanism for advancing film and a rewind mechanism for rewinding film, the combination comprising: a take-up spool having an elongated slotted opening, said take-up spool being adapted to have film wound thereon during operation of the film-feed mechanism and unwound therefrom during operation of the rewind mechanism; an elongated shaft movable axially between first and second positions extending axially from said spool; a film clamping member pivotally mounted on said shaft within said spool having a first position for clamping a film end to the edge of said slotted opening and a second position for releasing the film end; means for biasing said clamping member to said first position thereof; an actuating member fixed to said shaft for displacing said film clamping member from said first position to said second position thereof upon displacement of said shaft from said first to said second position thereof; means for biasing said shaft to said first position thereof; detent means for retaining said shaft in said first position thereof; a first operating member movable in response to operation of the film-feed mechanism for releasing said detent means to permit displacement of said shaft from said second to said first position thereof; and a second operating member for effecting operation of the rewind mechanism and for displacing said shaft from said first to said second position thereof.

3. In a photographic or cinematographic camera as claimed in claim 2 wherein said detent means comprises a recess formed on said shaft, a pivotal lever engageable with said recess and means for biasing said lever into engagement with said recess.

4. In a photographic or cinematographic camera as claimed in claim 3 wherein said first operating member comprises a rotatable wheel having an abutment thereon engageable with said lever upon movement of said wheel to displace said lever out of engagement with said recess.

5. In a photographic or cinematographic camera as claimed in claim 4 wherein said second operating member comprises a button formed on the end of said shaft for displacing the same.

6. In a photographic or cinematographic camera as claimed in claim 2 wherein said actuating member includes an extending arm having a wedge-shaped end portion which is adapted to be inserted between a surface of said clamping member and said slotted opening to displace said clamping member from said first position to said second position thereof.

7. In a photographic or cinematographic camera having a film-feed mechanism for advancing film and a rewind mechanism for rewinding film the combination comprising: a take-up spool adapted to have film wound thereon during operation of the film-feed mechanism and unwound therefrom during operation of the rewind mechanism; film-retaining means operatively associated with said take-up spool for engaging and retaining the end of a film within the same; means for rendering said film-retaining means effective to engage and retain a film in response to operation of the film-feed mechanism; and means for rendering said film-retaining means ineffective to engage and retain a film and for rendering the rewind mechanism operative to rewind film.

8. In a photographic or cinematographic camera having a film-feed mechanism for advancing film, the combination comprising: a take-up spool adapted to have film wound thereon during operation of the film-feed mechanism; film-retaining means operatively associated with said take-up spool for retaining the end of a film to said take-up spool; means for rendering said film-retaining means ineffective to retain a film end; and means for rendering said film-retaining means effective to retain a film in response to operation of the film-feed mechanism.

9. In a photographic or cinematographic camera having a film rewind mechanism for rewinding film, the combination comprising: a take-up spool adapted to have film wound thereon during film take up and unwound therefrom during operation of the rewind mechanism, film retaining means operatively associated with said take-up spool and effective to retain the end of a film to said take-up spool, and means for rendering said film-retaining means ineffective to retain a film end to said take-up spool and for actuating the rewind mechanism to unwind film from said take-up spool.

References Cited

UNITED STATES PATENTS

| | | | |
|---|---|---|---|
| 87,167 | 2/1869 | Haberbrush et al. | 242—74.1 |
| 2,059,242 | 11/1936 | Jung | 242—74.2 |
| 2,766,948 | 10/1956 | Mundt et al. | 242—74.1 |

FRANK J. COHEN, *Primary Examiner.*

N. L. MINTZ, *Assistant Examiner.*

UNITED STATES PATENT OFFICE
CERTIFICATE OF CORRECTION

Patent No. 3,353,766 November 21, 1967

Horst Simon

It is hereby certified that error appears in the above numbered patent requiring correction and that the said Letters Patent should read as corrected below.

Column 1, line 14, for "The application discloses a film retaining means" read -- A film retaining means is --; line 18, for "the" read -- a --; line 20, for "feeding" read -- retaining --.

Signed and sealed this 21st day of January 1969.

(SEAL)
Attest:

Edward M. Fletcher, Jr.
Attesting Officer

EDWARD J. BRENNER
Commissioner of Patents